E. G. SCHREIBER.
POTATO DIGGER.
APPLICATION FILED JAN. 4, 1908.
906,567.
Patented Dec. 15, 1908.
2 SHEETS—SHEET 1.
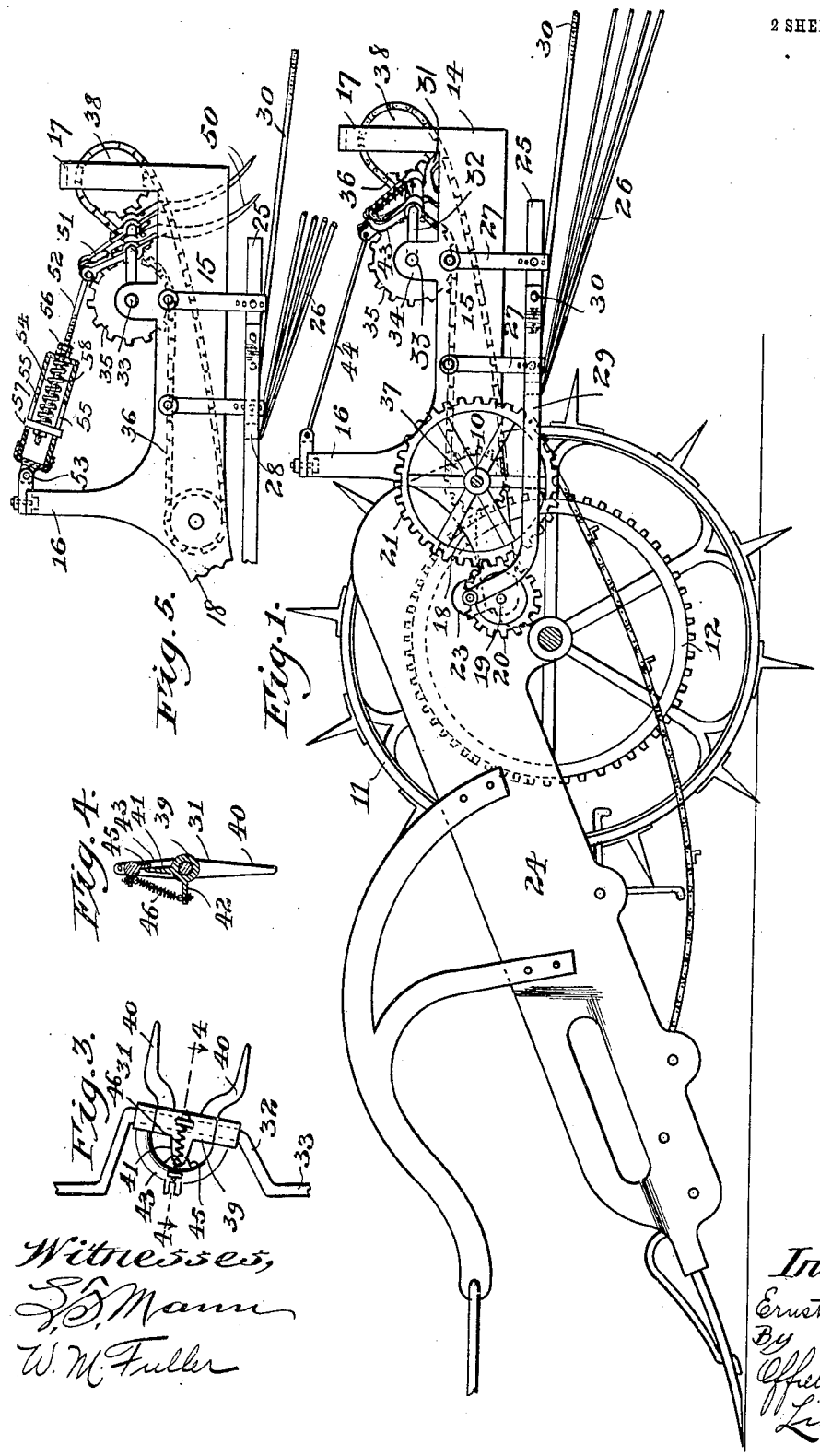

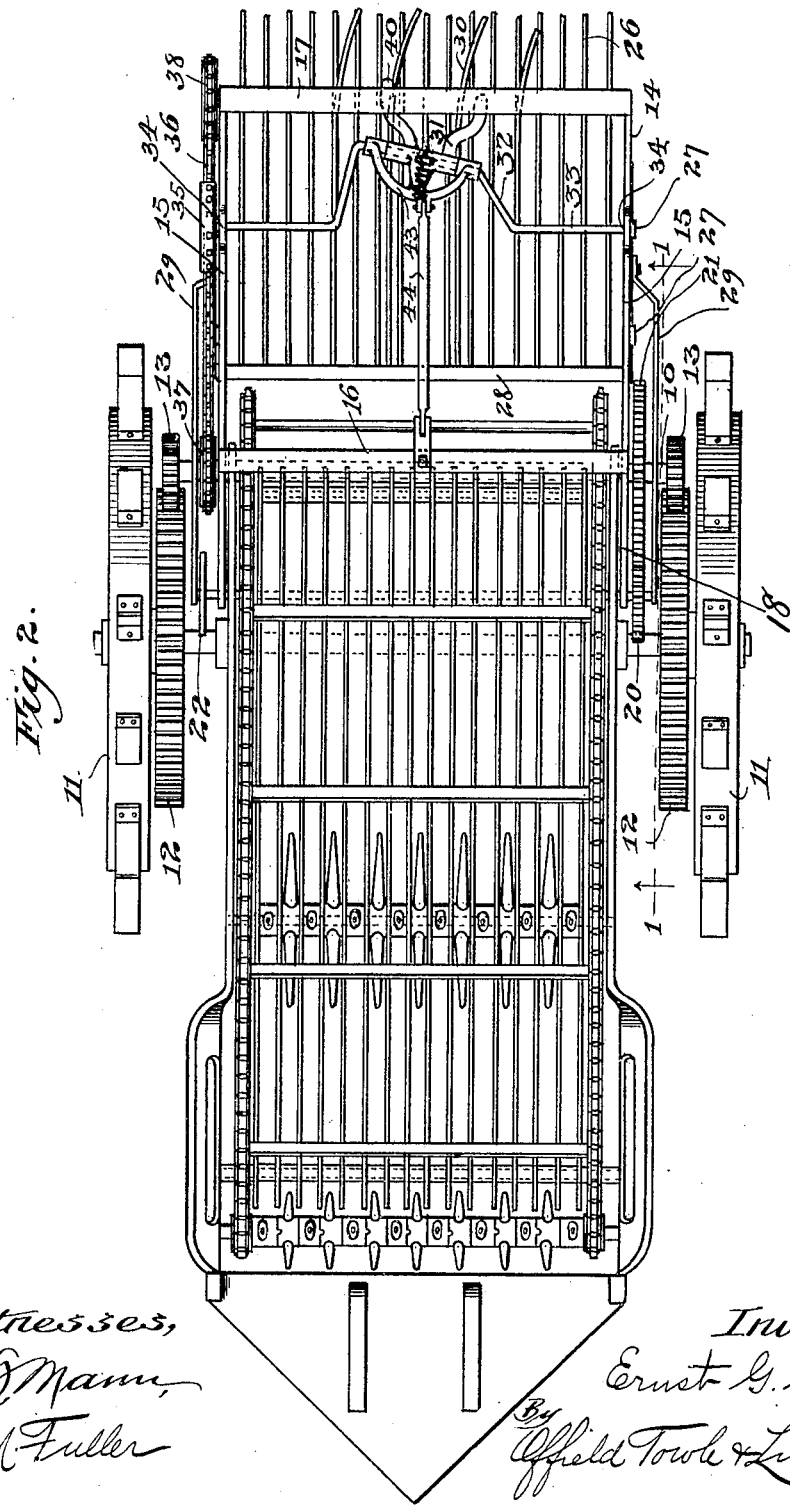

UNITED STATES PATENT OFFICE.

ERNST G. SCHREIBER, OF HAMMOND, INDIANA.

POTATO-DIGGER.

No. 906,567.

Specification of Letters Patent.

Patented Dec. 15, 1908.

Application filed January 4, 1908. Serial No. 409,356.

*To all whom it may concern:*

Be it known that I, ERNST G. SCHREIBER, a citizen of the United States, residing at Hammond, in the county of Lake and State of Indiana, have invented certain new and useful Improvements in Potato-Diggers, of which the following is a specification.

Although I herein describe a combined potato digger and separator, my present invention is limited to improvements in the construction of the latter, the former having been fully disclosed in my prior patent No. 853,601, granted May 14, 1907.

The purpose of this invention is to provide a simple and effective means for separating the earth and vines from the potatoes and casting the vines to one side.

On the accompanying drawings, forming a part of this specification and on the various views of which like reference characters refer to the same parts, I have illustrated preferred and desirable embodiments of my invention.

On these drawings—Figure 1 is a vertical section of the machine inside of one of the drive wheels on line 1—1 of Fig. 2; Fig. 2 is a plan view of the machine; Fig. 3 is a detail plan of the rake and its actuating mechanism; Fig. 4 is a section on line 4—4 of Fig. 3 viewed in the direction indicated by the arrow; and Fig. 5 is a partial elevation and partial section of a fragment of a modified form of the machine illustrating a different style of rake.
Since the main portion of the machine has been fully described and illustrated in my prior patent mentioned above, a further description of the same here is deemed unnecessary. Pivotally mounted on the main shaft 10, which is rotated from the large driving wheels 11 by means of coöperating large and small gears 12 and 13, is a separator frame 14 consisting of two side plates 15 united by front and rear arched or upwardly-bowed members 16 and 17. As is indicated, these side plates 15 are hinged or pivoted on shaft 10 and have forwardly-extending arms 18 in which is journaled a transverse or cross-shaft 19, carrying at one end a gear 20 meshing with another gear 21 on the shaft 10 and supplied at its other end with a crank disk 22. As is obvious, the rotation of shaft 10, which is derived from the carrying wheels 11 through the gears 12 and 13, is transmitted to the transverse shaft 19 by the coöperating gears 21 and 20. Suitable slots 23 are formed in the bottom edges of the side plates 24 of the digging portion of the machine to receive the shaft 19 when the frame 14 is lowered. No adjusting means for this frame is shown on the drawings but any suitable mechanism for this purpose may be employed, as is obvious. The side bars 25 of a screen 26 are each hung from the side plates or bars 15 of the frame 14 by means of a pair of links 27 of equal length which give to the screen a parallel-motion mounting. The screen itself consists of a plurality of substantially-parallel rods connected at their forward ends to a cross-bar 28 which connects together the side bars 25. Gear 20 and the crank-disk 22 are each provided with a wrist-pin to which is connected the forward end of a link or connecting bar 29, the rear end of which is joined at 30 to the corresponding side-bar 25 of the screen. It will be apparent from this construction that as the machine travels forwardly the rotation of the driving wheels 11 is transmitted through the gears 12 and 13, shaft 10, and gears 21 and 20 to the transverse shaft 19, and that because of the link connection between the gear 19 and crank disk 22 and the screen, the latter is shaken and given a parallel-motion movement due to the two-link mountings of the side bars 25 on the frame 14, the connection of the bars 25 with the links 27 being preferably adjustable, as indicated.

The screen 26 separates the earth from the potatoes, and in order to separate the vines from the potatoes a second screen 30 is arranged above the screen 26 and consists of rods having their front ends connected to the cross-bar 28 and their rear ends curved laterally or to one side, as is clearly shown in Fig. 2. Coacting or coöperating with the screen 30 is a rake 31 arranged upon an angularly-disposed crank portion 32 of a cross-shaft 33, the latter being rotatably mounted in suitable bearings 34 upon the side-plates 15. This shaft has on one of its ends a sprocket wheel 35 which meshes with the links of the upper stretch of a sprocket chain 36 passing over a sprocket wheel 37 on the main drive shaft 10, and also over an idle sprocket wheel 38 mounted upon the rear arch 17. The rake 31 has a hub 39 formed with rake fingers 40, a stop-arm 41, and a lug or projection 42 for the adjustment of a spring. The hub 39 is rotatable on the cranked portion 32 of the shaft 33 and is hinged between the legs of a substantially U-shaped hanger 43 loosely mounted on the crank 32 and pivotally connected to the rear end of a link 44, the front end of which is hinged to the forward arch bar 16. The stop arm 41 is normally held in engagement with a stop 45 upon the hanger 43 by means of a coil spring 46 which connects the hanger with the lug or projection 42, as is clearly shown in Fig. 4. It will be observed that when the crank shaft 33 is rotated by means of the sprocket chain 36 which derives its power from the main drive shaft 10, the rake will be oscillated, its rotation being prevented by the link 44 which holds the hanger 43 in place, so as to effectively engage the vines upon the rack or screen 30 and draw or throw them outwardly to one side of the machine. Owing to the spring connection 46 between the rake and the hanger, the former will yield if it engages a bunch of vines which is larger and heavier than it can move.

In Fig. 5 I have shown a different form of rake arrangement, this rake having a pair of prongs or fingers 50 of sufficient length during a portion of their travel to extend between and below the curved bars forming the screen 30. The upper ends of these fingers or prongs are bolted or screwed to a supporting member 51, bearings between the two being provided so that the parts may oscillate on the angularly-disposed portion of the cranked shaft 33 on which they are mounted.
Pivoted to the upper end of the supporting member 51 is a screw-threaded connecting rod 52, and hinged on the front arch 16 at the point 53 is a cylindrical casing 54 slotted on its opposite sides at 55 and centrally-apertured at its end adjacent to the rake to receive a part of the connecting rod 52 which extends therethrough into the interior of the casing or sleeve. Screw-threaded on the rod 52 and abutting against one end of the casing is a pair of nuts 56 which permit adjustment of the length of the combined rod and casing to be readily made, so that an efficient and correct action of the rake may be secured and any necessary adjustment made because of the wearing of the parts. At the end of the rod 52 and adjustable thereon is a cross-bar 57, the ends of which work and slide in the slots 55, and interposed between this crossbar or head and the end of the casing I provide a coil compression spring 58. During the ordinary operation of this modified form of the construction, the combined rod 52 and casing 54 acts merely as a convenient means for permitting the oscillation of the rake on the crank shaft to prevent its complete rotation. If the fingers of the rake, however, engage a bunch or body of the vines which they cannot readily move, the rod 52 slides within the casing against the action of spring 58, permitting sufficient variation in the movement of the rake to prevent damage of any of the parts. In general the operation of the mechanism shown in Fig. 5 is much like that of the remaining figures, but the construction is simpler and perhaps preferable, since among other things the length of the rod 52 can be varied or modified. It will be understood that the rake fingers or prongs in their operation travel to one side in substantial accordance with the curvature of the rods forming the screen 30, and that they move the vines to one side, effecting their ready discharge. Although I have shown and described the crank shaft 33 with only one cranked or off-set portion, it will be obvious that any number of these angularly-disposed cranked portions may be employed, each being equipped with an operating rake. The angular disposition of the cranked portions of the shaft may be anything desired, though perhaps an arrangement with the parts 180 degrees apart would be preferable.

Although I have described with a considerable degree of particularity the details of construction of this portion of my improved digger and separator, it is to be understood that my invention is not restricted to the precise structural features shown, which may be varied within wide limits without departure from the substance or essence of my invention and without sacrificing its benefits and advantages.

I claim:

1. In a separating mechanism for a potato digger, the combination of a screen composed of rods bent toward one side of the machine, a shaft having a cranked portion angularly disposed with relation to the main axis of the shaft, a rake hinged on said cranked portion, a connection between said rake and a part of the machine, and means to rotate said shaft, substantially as described.

2. In a separating mechanism for a potato digger, the combination of a screen composed of rods bent toward one side of the machine, a shaft having a cranked portion angularly disposed with relation to the main axis of the shaft, a rake hinged on said cranked portion, a connection adjustable as to length between said rake and a part of the machine, and means to rotate said shaft, substantially as described.

3. In a separating mechanism for a potato digger, the combination of a screen composed of rods bent toward one side of the machine, a shaft having a cranked portion angularly disposed with relation to the main axis of the shaft, a rake hinged on said cranked portion, a spring connection adjustable as to length between said rake and a part of the machine, and means to rotate said shaft, substantially as described.

4. In a separating mechanism for a potato digger, the combination of a screen composed of rods bent toward one side of the machine, a shaft having a cranked portion angularly disposed with relation to the main axis of the shaft, a rake hinged on said cranked portion, a connection between said rake and a part of the machine consisting of a rod, a casing surrounding said rod, a spring interposed between said casing and rod and acting thereupon, and means to rotate said shaft, substantially as described.

5. In a separating mechanism for a potato digger, the combination of a screen composed of rods bent toward one side of the machine, a shaft having a cranked portion angularly disposed with relation to the main axis of the shaft, a rake hinged on said cranked portion, means to rotate said shaft, and a connection between said rake and a part of the machine consisting of a screw-threaded rod, a casing within which said rod is slidable, a nut on said rod adapted to abut against an outer face of said casing, an adjustable abutment on said rod in said casing, and a spring interposed between said abutment and said casing, substantially as described.

6. In a separating mechanism for a potato digger, the combination of a vibratory screen composed of rods bent toward one side of the machine, a shaft having a cranked portion angularly disposed with relation to the main axis of the shaft, a rake hinged on said cranked portion, a connection between said rake and a part of the machine, and means to rotate said shaft, substantially as described.

7. In a separating mechanism for a potato digger, the combination of a screen composed of rods bent toward one side of the machine, a parallel-motion mounting for said screen, means to vibrate said screen on said parallel-motion mounting, a shaft having a cranked portion angularly disposed with relation to the main axis of the shaft, a rake hinged to said cranked portion, a connection between said rake and a part of the machine, and means to rotate said shaft, substantially as described.

8. In a separating mechanism for a potato digger, the combination of a screen composed of rods bent toward one side of the machine, a parallel-motion mounting for said screen, means to vibrate said screen on said parallel-motion mounting, a shaft having a cranked portion angularly disposed with relation to the main axis of the shaft, means to rotate said shaft, a rake hinged on said cranked portion, and a connection capable of elongation hinged to said rake and to a part of the machine, substantially as described.

ERNST G. SCHREIBER.

Witnesses:
WALTER M. FULLER,
FREDERICK C. GOODWIN.